Aug. 26, 1969 J. F. JAMMET 3,463,669
MANGANESE DIOXIDE-ZINC ALKALINE SECONDARY CELL
Filed Dec. 22, 1966 2 Sheets-Sheet 1

INVENTOR
JEAN-FIRMIN JAMMET
BY
ATTORNEYS

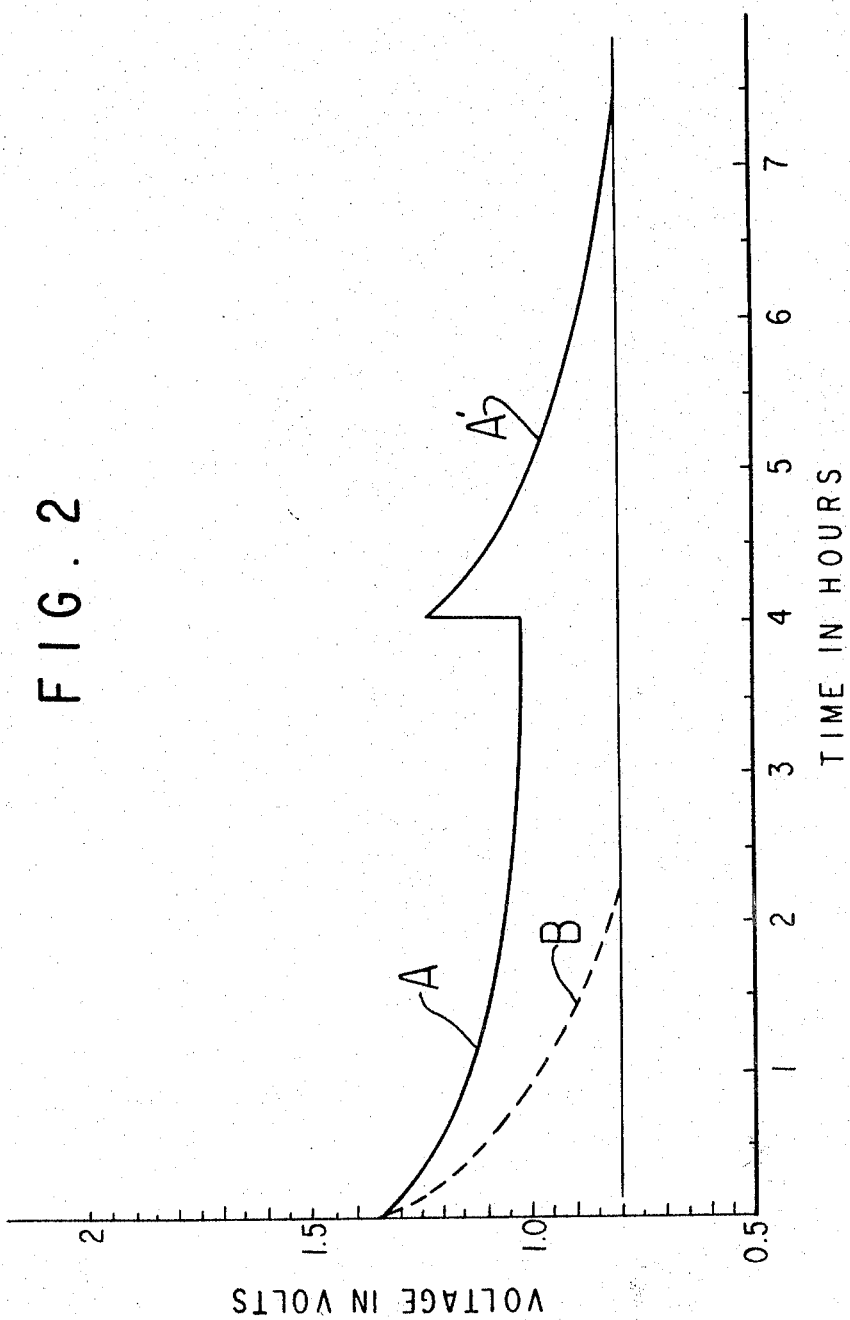

United States Patent Office 3,463,669
Patented Aug. 26, 1969

3,463,669
MANGANESE DIOXIDE-ZINC ALKALINE
SECONDARY CELL
Jean Firmin Jammet, Poitiers, France, assignor to Societe
des Accumulateurs Fixes et de Traction (Societe Anonyme), Romainville, France, a French company
Filed Dec. 22, 1966, Ser. No. 611,201
Claims priority, application France, Dec. 28, 1965,
44,025
Int. Cl. H01m 43/02
U.S. Cl. 136—6          21 Claims

ABSTRACT OF THE DISCLOSURE

This disclosure relates to structure of an alkaline secondary cell utilizing the positive manganese dioxide-carbon electrode negative zinc electrode system with modified internal zinc electrode construction and novel separator arrangements between the negative and positive compartments of the cell as a result of which the cell is capable of large output capacity as compared with a primary cell utilizing the same system and which secondary cell is rechargeable many times in manner similar to storage cells. The disclosure also includes an assembly process for the manufacture of such rechargeable alkaline secondary cells.

---

Figure 1:
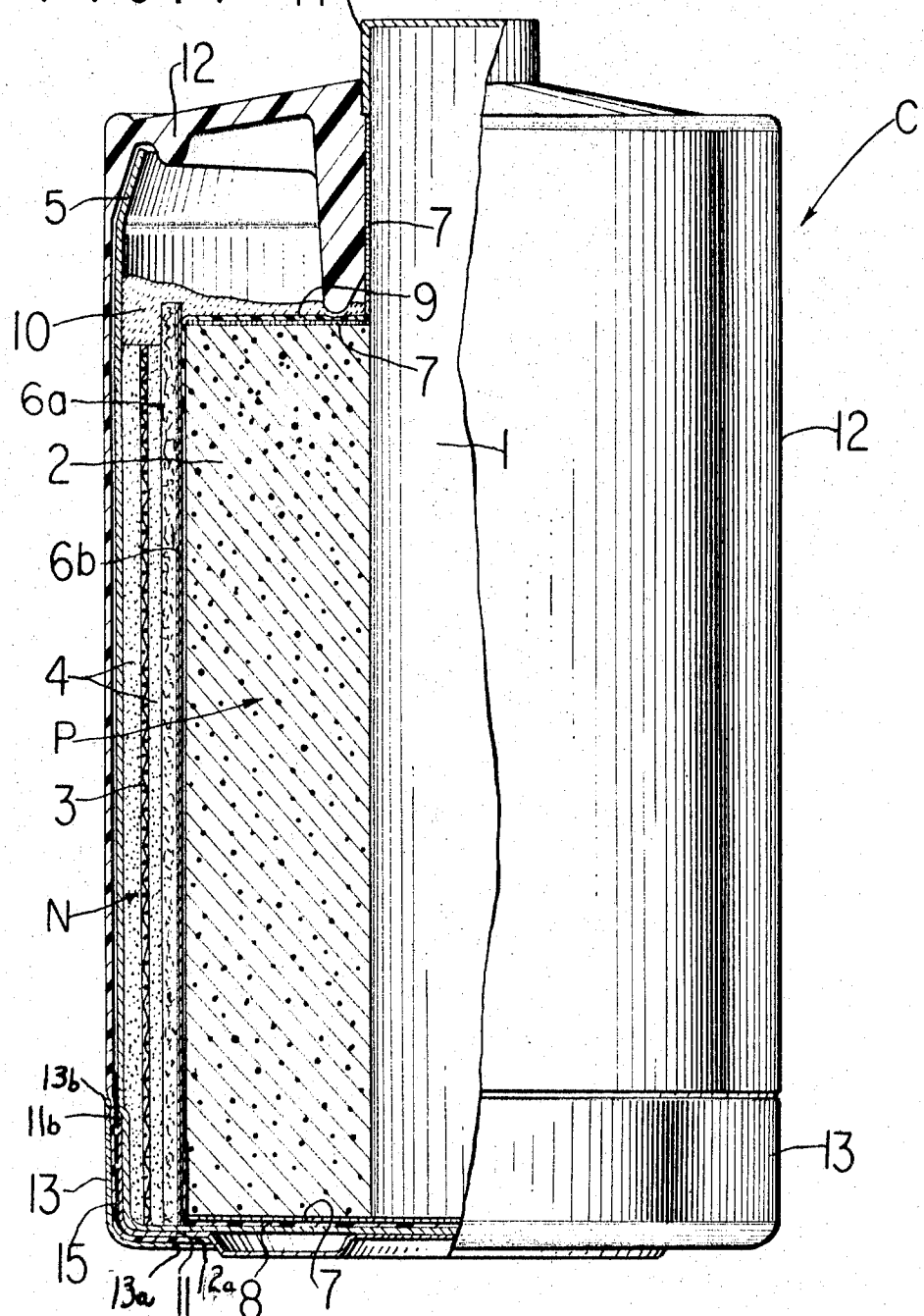

A related application Ser. No. 428,714, filed Jan. 29, 1965, now Patent No. 3,342,644, by the same inventor is currently pending being entitled: Improved Sealed Electrochemical Cell.

Brief summary of invention

This invention relates to an alkaline secondary cell using the manganese dioxide-zinc system.

This system has been used since many years to obtain alkaline primary cells able to undergo only a limited number of recharging cycles, this limitation being a result of the irreversibility of polarization phenomena in the cell.

An object of the invention is to modify these primary cell designs so that they may be recharged a great number of times similarly to storage cells.

The invention relates particularly to a cell with an alkaline electrolyte using the manganese dioxide-zinc system, particularly remarkable in that a barrier is located between the positive electrode compartment containing manganese dioxide and the zinc negative electrode compartment, the said barrier preventing the migration of the zinc from the negative electrode compartment to the positive electrode compartment.

For illustrative purposes and in no way limiting the invention, the barrier may consist in the adjunction to an appropirate separator of a semi-permeable membrane, such as cellophane, for instance, or gel as formed by potato starch, for example.

Such a barrier is not sufficient to prevent gas evolution at rest, and more precisely hydrogen evolution caused by the action of the electrolyte on the negative zinc electrode.

This reaction, and, therefore, gas evolution, I have found, can be impeded by the addition of a determined quantity of zinc oxide into the electrolyte in the negative electrode compartment, whereas no zinc oxide is contained in the positive electrode compartment. This is an important aspect and feature of the invention.

Such a secondary cell can thus be sealed in a container and operate as a sealed cell, with special care in charging and discharging, and can be discharged and charged repetitively through many cycles ranging upward to at least fifty.

Other objects and features of the invention will become apparent from the following description taken in conjunction with the accompaying drawings.

Drawings

In the accompanying drawings forming part hereof,
FIGURE 1 is a vertical elevation partially in section of a cylindrical cell embodying the invention; and
FIGURE 2 is a graphical illustration of discharge curves of a cylindrical cell embodying the invention and of a similar discharge curve of a primary cell of the same dimensions, both utilizing the manganese dioxide-zinc couple for comparison purposes, curves A and A' being of the secondary cell embodying the invention and curve B being of the said primary cell, the ordinates being voltage in volts and the abscissae being time in hours.

Detailed description

Referring to the drawings, and first to FIGURE 1, the reference character C denotes generally a cylindrical secondary cell embodying the invention. In this cell C, the positive electrode P of the secondary cell, is similar in construction to that of a positive manganese dioxide electrode of a conventional cylindrical primary cell, comprising a carbon rod 1 and a surrounding depolarizing mix 2 which is generally cylindrically shaped and firmly compressed about said rod 1.

The depolarizer mix 2 is preferably composed of 80–85% $MnO_2$ and 20–15% graphite (preferably in flakes) by weight. The amount of electrolyte (which is an aqueous solution of potassium hydroxide), contained in the depolarizer mix must be sufficient to completely impregnate the depolarizer mix when it is in the compressed state.

The composition of the impregnated depolarizer mix 2 may be as follows:

80–85 g. $MnO_2$
20–15 g. graphite (preferably in flake form)
14 cc. 9 N KOH

The cell C of this invention is also provided with a cylindrical zinc negative electrode N surrounding the depolarizer mix 2. This negative electrode N can be of the usual type but, according to a particularly preferred aspect of the invention, it comprises a perforated cylindrical zinc support 3, made, for example of zinc wire-netting or gauze or a zinc perforated sheet or an expanded zinc metal sheet comprised of one or several plies, said support 3 being coated on one or both sides with a layer 4 of zinc powder.

Each said layer 4, can, for instance, be comprised of a paste of zinc powder mixed with a swelling and binding material, the said swelling material being, for instance, as follows:

A compound related to cellulosic derivatives such as carboxymethylcellulose, methylcellulose, hydroxyethylcellulose or hydroxymethylcellulose; or starch such as potato, corn or rice starch, or an alginate or alginic acid derivative, or
a ligneous product, such as lignin, or
a soluble resin, such as a carboxyvinyl polymer, or
a polyvinyl alcohol derivative preferably of low viscosity, or a compound giving polyvinyl alcohol by hydrolysis or saponification, such as polyvinyl acetate.

The zinc support 3, after application of the paste thereof on one or both sides can be calendered or planished.

As an example, a composition of a paste applied to said support which has been found satisfactory comprised:

100 cc. water
100 g. amalgamated zinc powder
8 g. potato starch

Experimentally, a negative electrode N has been made which is about 2 millimeters thick, comprising a middle sheet of expanded zinc about 0.2 millimeter thick with layers 4 of zinc paste each about 0.4 millimeter thick. Such electrodes N are rigid in the dry state, but can readily be bent or rolled after being steamed or watered.

According to the embodiment of the invention as shown in FIGURE 1, the negative electrode N is curved into the shape of a cylinder and is introduced into a cylindrical can 5 which is preferably of zinc to avoid electrical couples.

The negative electrode N is soaked with an electrolyte, such as an aqueous solution of potassium hydroxide, for example, either prior to or subsequent to its introduction into the zinc can 5.

According to this invention and importantly, the latter electrolyte also contains zinc oxide. Its composition may be, for example:

100 g. 85% KOH
100 cc. $H_2O$
16 g. ZnO

Further in accord with the invention, a separator 6a is interposed within the can 5 between its two compartments containing respectively the positive and the negative electrodes P and N, the said separator 6a being associated with a barrier 6b which latter serves to stop zinc migration from the negative electrode N to the positive electrode P.

The said separator 6a may comprise, for example, a nylon felted fabric, the zinc being prevented from migrating from the negative electrode N by a barrier in the form of an adjunction of one or more layers 6b of a semi-permeable membrane, such as cellophane, for instance, preferably positioned on the positive electrode side of the said separator.

To increase the absorbing power of the separator 6a, a preliminary treatment can be given to its nylon fibers with a wetting agent such as carboxymethylcellulose or an equivalent.

Instead of cellophane barrier layers 6b, a jellifying agent such as potato starch may be used, this agent impregnating the nylon fibrous fabric of separator 6.

The upper part of the carbon rod 1 and the upper and lower surfaces of the depolarizing mix 2 are coated with a thin layer 7 of paraffin wax. The lower part of the said mix 2 is capped or covered by an insulating cup 8, which may be, for example, of plastic material, resting on the bottom of zinc can 5. In the same way, the upper part of the said mix 2 may be capped or covered by a cup 9 of the same plastic material which is provided with a central bore for the passage therethrough of the projecting carbon rod 1.

A sealing compound 10, such as wax or pitch, is applied as by pouring over the top ends of the negative electrode N and the capped depolarizer mix 2.

A metal cup 11 of tinned steel sheet, for example, whose bottom may be provided with grooves and ridges is applied and cold pressed onto the lower part of the can 5. The whole assembly is then positioned in an external plastic casing 12, and then a metal ring 13 of tinned steel sheet, for example, which is substantially L-shaped in half-section is cold pressed onto the lower part of the said casing 12. The inner edge 13a of the bottom of ring 13 has a large enough diameter so as to lie out of contact with the ribbed and grooved bottom of metal cup 11, being separated from it by the castellated lower part 12a of the plastic casing 12.

The upper end of the carbon rod is covered or capped with a metallic contact cap 14.

According to the invention, lower regions of the outer surface of the zinc assembly can 5 and outer surface of metal cup 11 are coated with a thin layer of pitch 15 extending above the upper cup edge 11b. Thus, a possible creeping of the alkaline electrolyte is prevented along the walls of the zinc can 5.

Advantageously, the said pitch layer 15 can be made more adherent by tinning of the metal cup 11.

Advantageously, the upper edge 13b of the L ring 13 extends beyond the upper edge 11b of the cylindrical part of the metal cup 11. Thus, in cold compression of ring 13, the plastic casing 12 becomes pinched between the upper side wall of the L ring 13 and the zinc can, thus resulting in creation of a barrier opposed to creeping up of electrolyte towards the cup-can joint.

As a matter of fact, otherwise, some electrolyte could reach the edge 11b of the cup 11 in contact with the can, and owing to a possible defect in the tin coating on the edge of the cup 11, an electrochemical couple could appear, readily corroding the zinc can 5. This is prevented by the structure just described.

A secondary cell C such as described hereabove can be manufactured according to the following process:

The negative electrode N is spirally wound or otherwise formed or curved into the shape of a cylinder, and is placed into a cylindrical can 5. Then a positive electrode assembly P comprising the depolarizer mix 2 soaked or fully impregnated with electrolyte surrounding the carbon rod 1, the said assembly being wrapped in a suitable separator 6a, provided with a barrier 6b to stop zinc migration and with two insulating washers or cups 9 on the opposite plane faces of the cylindrical mix is placed in the can 5 inside the cylindrical negative electrode N. Then, an adequate amount of the above described electrolyte is injected into the negative compartment, i.e., the portion of can 5 containing the negative electrode N to soak it as described above.

The can 5 is then cold-pressed or formed according to a process such as that described in my U.S. Patent No. 3,040,117 dated June 19, 1962 and entitled "Process for Manufacturing Primary Dry Cells" by the same inventor and issued to the same assignee.

In such a process, the depolarizing mix 2 is compressed by the double action of the cold-compression of can 5 and of the swelling action of separator materials 6a and 6b caused by electrolyte.

A sealing compound 10, such as wax or pitch, is then poured into the still open upper end of the can 5 over the top of the depolarizer mix. A metal cup 11 is then mounted on the bottom of the can 5, and its external diameter is then reduced to the overall diameter of the can 5 above the level of the upper edge 11b of said cup 11. The lower region of the external surface of the can-cup assembly is then coated with the pitch layer 15 extending along the cup side-walls and beyond its upper edges. Then, the can cup assembly is placed in the plastic outer casing 12 which is provided with a castellated lower end such as that described in my U.S. Patent No. 3,168,420, dated Feb. 2, 1965 under the title "Leak-Resistant Electrochemical Cell and Process for Manufacturing the Same" and issued to the same assignee.

The central bore at the upper end of the plastic casing 12 slips easily on and over the upper projecting end of carbon rod 1 which is coated with paraffin wax and the inner edge 12b of casing 12 presses into the pitch layer 10 as shown in FIGURE 1. The outer projecting end of the carbon rod 1 is fitted with a brass cup or contact terminal of the conventional type. An L-shaped ring in half-section 13 whose upper edge 13b is higher than the upper edge 11b of the aforesaid cup 11 is then positioned on the lower part of casing 12 and the said lower part of the plastic casing 12 then becomes pinched by cold-compression of the cylindrical part of the said ring 13, since the outer diameter of the said ring 13 is reduced by its cold compression to nearly the diameter of the upper part of the casing. Thus, the outer contour of the completed cell C has substantially uniform diameter in its entire length.

A somewhat similar method is described in my said co-pending application, Ser. No. 498,714.

FIGURE 2 shows discharge curves A and A' (voltage in volts vs. time in hours) of a secondary cell C of, for example, conventional size D embodying the invention and by way of comparison the discharge curve B of a primary cell of the same size, both using the manganese dioxide-zinc couple system.

The following data are given for illustration, and not limitatively. Discharge through a resistor of 1.66 ohm resistance and daily discharge periods of 4 hours resulted in a capacity of 4.850 ampere hours for the size D secondary cell C embodying the invention, instead of 1.360 ampere hours for the similar size D primary cell, for an average discharge rate of 650 ma., showing thus an improved output that is four times greater for the secondary cell C of this invention as compared with the output of the correspondingly sized primary cell.

The depth for discharge cycling of cells C embodying the invention may be 25% corresponding to a discharge time of 2 hours through the 1.66 ohm resistance referred to above. Charging of said cells C may be achieved at nearly constant voltage with currents ranging from 48 ma. to 80 ma. over a period of 19 hours. The cycle life of such cells C has averaged fifty cycles. It is apparent that practice of this invention provides a rechargeable secondary cell utilizing the manganese dioxide-zinc system that is vastly superior to a primary cell utilizing a like system with respect to output capacity and length of life.

It is understood that the invention is not limited to the embodiments described and illustrated hereabove, such embodiments being given as examples only. Particularly, within the scope of the invention, modifications within the scope of the claims may be effected either as to details of construction or by replacement of various of the means described by equivalent means. There is no intention, therefore, of limitation to the exact disclosure herein presented.

What is claimed is:

1. A secondary cell of the alkaline electrolyte type utilizing a positive manganese dioxide-carbon electrode and negative zinc electrode system comprising a separator and a barrier interposed between positive and negative electrode and dividing them into separate compartments in said cell to prevent zinc migration from the negative electrode to the positive electrode, and wherein said separator is of felted fabric and said barrier comprises semi-permeable material applied to said separator, and wherein the positive and negative electrode containing compartments contain different alkaline electrolytes, the alkaline electrolyte in the positive electrode containing compartment being free of zinc oxide, and the alkaline electrolyte in the negative electrode containing compartment also including zinc oxide.

2. A secondary cell of the alkaline electrolyte type according to claim 1 wherein said felted fabric comprises nylon fibers, and said semi-permeable material is regenerated cellulose applied as at least one layer to a face of said separator.

3. A secondary cell of the alkaline electrolyte type according to claim 1 wherein said felted fabric comprises nylon fibers, and such semi-permeable material is a jellifying agent impregnated into the fabric.

4. A secondary cell of the alkaline electrolyte type according to claim 3 wherein said jellifying agent is potato starch.

5. A secondary cell of the alkaline electrolyte type according to claim 2 wherein said felted fabric comprises plastic fibers bearing a wetting agent.

6. A secondary cell of the alkaline electrolyte type according to claim 5 wherein said plastic fibers are of nylon and said wetting agent is carboxymethylcellulose.

7. A secondary cell of the alkaline electrolyte type according to claim 2 wherein each such layer is applied adjacent to the positive face of said separator.

8. A secondary cell of the alkaline type according to claim 1 wherein said separator serves as a support for said barrier and the semi-permeable material of the latter comprises a plurality of layers of regenerated cellulosic material applied to the positive face of said separator.

9. A secondary alkaline cell according to claim 1 wherein said positive and negative electrodes in the respective compartments are separately impregnated with said different alkaline electrolytes.

10. A secondary alkaline cell according to claim 1, wherein the alkaline electrolyte within the compartment containing the negative electrode contains zinc oxide in the proportion of about 16 g. of zinc oxide for each 100 g. of 85% KOH electrolyte in 100 cc. of water, while the alkaline electrolyte within the compartment containing the positive electrode is 9 N KOH and is free of zinc oxide.

11. A secondary alkaline cell including a positive electrode comprising a centrally disposed carbon rod, a terminal member therefor, and a depolarizing mix surrounding the carbon rod, a negative zinc electrode enveloping said positive electrode, a separator interposed between said negative zinc electrode and said depolarizing mix and including barrier means to preclude migration of the zinc defining respective positive and negative electrode compartments within the cell, separate alkaline electrolyte in each compartment, said electrodes, separator and barrier means constituting an assembly, a cold-compressed metallic container for said assembly, a cold pressed metallic cup member applied to the bottom of said container, a plastic insulative casing telescopically mounted onto and covering said container and cup member, said casing having a castellated lower end and a cold-pressed L-shaped ring in half section mounted at the lower end of said container whose cold-pressed dimensions are approximately those of the casing so that the external dimensions of said casing and ring are approximately alike, and means for insulating the compartment containing the negative electrode from the compartment containing the positive electrode.

12. A secondary alkaline cell according to claim 11 including an insulating layer of pitch between said metallic container and said cup member, said layer extending above the upper edge of said cup member.

13. A secondary alakaline cell according to claim 11 wherein the upper edge of said ring member lies above the upper edge of the cup member.

14. A secondary alkaline cell according to claim 11 wherein said negative electrode comprises a perforated zinc support and a zinc powder layer applied on at least one side of said zinc support.

15. A secondary alkaline cell according to claim 14 wherein said perforated zinc support is wire netting.

16. A secondary alkaline cell according to claim 14 wherein said perforated zinc support is of expanded metal.

17. A secondary alkaline cell according to claim 14 wherein each said zinc powder layer is applied as a paste, said paste comprising a mixture of said zinc powder with a swelling and binding agent.

18. A secondary alkaline cell according to claim 17 wherein said swelling and binding agent is selected from the group consisting of compounds selected from cellulosic derivatives, namely, carboxymethylcellulose, methylcellulose, hydroxyethylcelluose and hydroxymethylcellulose; potato, corn and rice starches, alginates, alginic acid derivatives, ligneous products including lignin, soluble resins including carboxylvinyl copolymer, low viscosity polyvinyl alcohol derivatives, and compounds yielding polyvinyl alcohol by hydrolysis or saponification including polyvinyl acetate.

19. A secondary alkaline cell according to claim 19, wherein said paste comprises for each 100 cc. water, 100 g. amalgamated zinc powder, and 8 g. potato starch.

20. A secondary alkaline cell according to claim 14 wherein said support is approximately 0.2 millimeter thick wherein there are two zinc powder layers and each of said layers is approximately 0.4 millimeter thick so that the overall thickness of said negative electrode is approximately 2 millimeters.

21. A process for manufacturing secondary alkaline electrolyte cells comprising providing a metallic container, inserting a negative zinc electrode into said container to conform to its internal dimensions, providing a positive electrode comprising a carbon rod surrounded by a depolarizing mix, soaking said positive electrode with alkaline electrolyte, wrapping barrier-separator means about said depolarizing mix the barrier serving to prevent zinc migration within the cell, inserting the barrier-separator wrapped positive electrode into said container within the negative zinc electrode, insulating said depolarizing mix from said negative zinc electrode, injecting the negative electrode compartment with an alkaline electrolyte containing zinc oxide, cold pressing the container, applying a sealing compound in the open upper end of the container, applying a metallic cup to the bottom of the container and cold pressing said cup to reduce its external dimensions to approximately those of the container not covered by the cup, applying a coating of insulative material over the external surfaces of the cup, mounting a plastic casing telescopically over the container and cup with the carbon rod projecting outwardly thereof, applying a metallic cap to the projecting end of the carbon rod, mounting an L-shaped metallic ring in half section at the bottom of the container over the casing and cold pressing said ring to reduce its outer diameter to substantially that of portions of the casing not covered by said ring and also to pinch the casing between said ring and said container.

References Cited

UNITED STATES PATENTS

| | | | |
|---|---|---|---|
| 2,422,045 | 6/1947 | Ruben | 136—107 |
| 2,480,839 | 9/1949 | Daniel | 136—107 |
| 2,481,539 | 9/1949 | Ruben | 136—175 |
| 2,499,419 | 3/1950 | Ruben | 136—107 |
| 2,593,893 | 4/1952 | King | 136—107 |
| 2,692,904 | 10/1954 | Strauss | 136—30 |
| 2,923,757 | 2/1960 | Klopp | 136—107 |
| 3,018,316 | 1/1962 | Higgins et al. | 136—144 |
| 3,114,659 | 12/1963 | Warren | 136—133 XR |
| 3,168,420 | 2/1965 | Jammett | 136—133 |
| 3,288,651 | 11/1966 | Linton | 136—107 |

WINSTON A. DOUGLAS, Primary Examiner

A. SKAPARS, Assistant Examiner

U.S. Cl. X.R.

136—107, 146, 157